United States Patent
Hawighorst

(10) Patent No.: US 9,511,658 B2
(45) Date of Patent: Dec. 6, 2016

(54) BATTERY CHANGING DEVICE FOR AN ELECTRICALLY DRIVABLE VEHICLE

(71) Applicant: Robert Bosch GmbH, Stuttgart (DE)

(72) Inventor: Achim Hawighorst, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/994,258

(22) Filed: Jan. 13, 2016

(65) Prior Publication Data

US 2016/0200186 A1 Jul. 14, 2016

(30) Foreign Application Priority Data

Jan. 14, 2015 (DE) .................. 10 2015 200 388

(51) Int. Cl.
*B60K 1/04* (2006.01)

(52) U.S. Cl.
CPC ......... *B60K 1/04* (2013.01); *B60K 2001/0477* (2013.01); *B60K 2001/0494* (2013.01)

(58) Field of Classification Search
CPC ...... A61K 31/406; A61K 45/06; A61K 31/40; A61K 31/00; B60R 16/04
See application file for complete search history.

(56) References Cited

U.S. PATENT DOCUMENTS

2004/0124662 A1* 7/2004 Cleland ................. E05F 1/1091
296/146.4
2007/0265753 A1* 11/2007 Cantu ..................... B60J 5/042
701/45

FOREIGN PATENT DOCUMENTS

| CN | 203580596 U | * | 5/2014 |
|----|-------------|---|--------|
| DE | 19654685 A1 | | 7/1997 |
| DE | 10240854 A1 | | 3/2004 |
| DE | 102006050431 A1 | | 4/2008 |
| DE | 102006055361 A1 | | 5/2008 |
| DE | 202011004219 | | 6/2011 |
| DE | 102010022754 A1 | | 12/2011 |
| DE | 102010022755 A1 | | 12/2011 |
| DE | 102012105456 A1 | | 12/2013 |

* cited by examiner

*Primary Examiner* — John Walters
*Assistant Examiner* — James Triggs
(74) *Attorney, Agent, or Firm* — Michael Best & Friedrich LLP

(57) ABSTRACT

A battery changing device (10) for an at least electrically drivable vehicle (100), having at least one receiving part (11) for receiving at least one battery module (20), wherein the receiving part (11) is moveable between an operating position, in which the battery module (20) is operable on the vehicle (100), and a changing position, in which the battery module (20) is interchangeable to the vehicle (100). A drive (40) is operationally connected to a closure element (12), as a result of which the closure element (12) is moveable into a closing position, in which the battery module (20) is operable on the vehicle (100), and into an open position, in which the battery module (20) is interchangeable to the vehicle (100).

15 Claims, 2 Drawing Sheets

FIG. 5
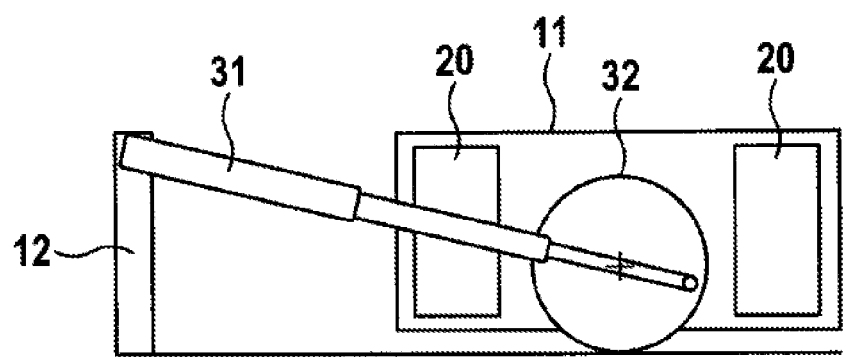
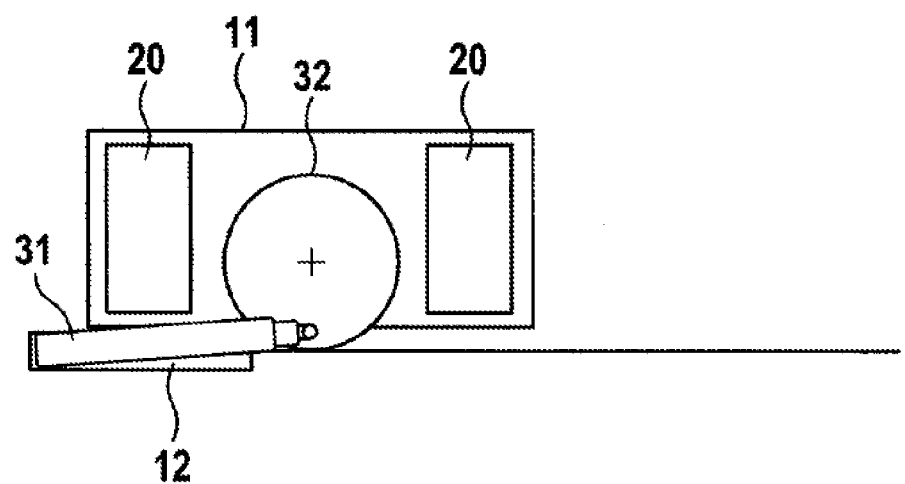
FIG. 6

BATTERY CHANGING DEVICE FOR AN ELECTRICALLY DRIVABLE VEHICLE

BACKGROUND OF THE INVENTION

The present invention relates to a battery changing device and to a vehicle having a battery changing device, with at least one receiving part for receiving at least one battery module, wherein the receiving part is moveable between an operating position, in which the battery module is operable on the vehicle, and a changing position, in which the battery module is interchangeable to the vehicle.

From the prior art it is known that hybrid as well as plug-in hybrid as well as electric vehicles are at least at times operable by means of electric energy, which is stored in suitable energy storage units, such as in for example accumulators or battery modules. These battery modules are arranged in a region within the vehicle in order to be able to make available to the vehicle electric energy for operating an electric motor when required.

Electrically drivable vehicles mostly comprise interchangeable battery modules, which in the case of charge or discharge or a defect can be removed. In addition to this there are concepts for a consumption-oriented energy supply for electric vehicles, with which the user can himself determine the number of required battery modules. With this modular energy supply, the battery modules are gradually connected so that depending on the required range, corresponding energy can be provided, as a result of which both the vehicle costs and also the vehicle weight can be lowered. To this end it is necessary that the battery modules are practically positioned within the vehicle and can be easily exchanged. Depending on the desired range, battery modules can be installed or removed. Oversized battery modules accordingly need no longer be necessarily carried along when the user would merely like to travel short route profiles.

From DE 20 2011 004 219 U1 a device for the battery change with electric vehicles is disclosed, wherein the vehicle has to be moved into a changing device, in which the energy storage units can be removed and installed. The described device constitutes an external station which exists independently of the vehicle and is thus not suitable for a decentralized battery change. The user initially has to move the vehicle into a changing device in order to have a battery module change carried out by the device and cannot himself perform the battery change.

SUMMARY OF THE INVENTION

It is therefore the object of the present invention to largely avoid the disadvantages with a battery changing device described above. In particular it is the object of the present invention to create a battery changing device and a vehicle having a battery changing device, with which the exchangement of the battery modules is facilitated and simultaneously the battery modules are protected from external influences.

The above object is solved through a battery changing device and a vehicle having a battery changing device according to the invention. Further features and details of the invention are obtained from the description and the drawings. Here, features and details which are described in connection with the battery changing device obviously apply also in connection with the vehicle according to the invention and in each case conversely, so that with respect to the disclosure mutual reference is always made or can always be made to the individual aspects of the invention.

According to the invention, the battery changing device for an at least electrically drivable vehicle comprises at least one receiving part for receiving at least one battery module, wherein the receiving part is moveable between an operating position, in which the battery module is operable on the vehicle, and a changing position, in which the battery module is interchangeable to the vehicle. A drive is operationally connected to a closure element for the receiving part, as a result of which the closure element is moveable into a closing position, in which the battery module is operable on the vehicle, and into an open position, in which the battery module is interchangeable to the vehicle. At the same time, the receiving part, in the closing position, is located inaccessible from the outside behind the closure element and thus protected against external influences such as moisture, breaking-open attempts, manipulations and the like.

Substantial for the invention here is the comfortable and simultaneously protected (protected against theft and manipulations) access to the receiving part or the battery module which is made possible by the drive. This makes possible a module energy supply, wherein the user can exchange battery modules to suite requirement. In addition it is thereby made possible that the battery modules are dimensioned in weight and form in such a manner that they can only be removed through personal force. This also means that the user can transport the battery modules for charging or discharging out of the vehicle and into a charging station which is not directly arranged on the vehicle or has to be connected to the vehicle. In addition to this, the closure element protects from the unauthorized removal of the battery modules, which is of substantial significance with the correspondingly high costs of the battery modules, which can constitute up to a third of the total costs of an electrically operated vehicle. Also in the case of an accident and shock or vibrations of the vehicle, the battery module or the receiving part is protected by a closure element according to the invention against being dislodged from the operating position.

It is conceivable that the closure element between the operating position and the changing position performs a one or a two-dimensional movement, so that both a translatoric, a rotatoric or a combination of the two movements can be performed.

It is conceivable, furthermore, that the battery module can be exchanged at the rear or the front of the vehicle or on a side of the vehicle. To this end, the battery changing device can be arranged at the corresponding location in or on the vehicle.

In addition to this it is conceivable that the receiving part and/or the closure element is moveable along a guide, as a result of which canting can be prevented. A guide additionally ensures that the battery module in the receiving part enters into contact with the corresponding mating contact in the vehicle. Here, the guide can be embodied for example rail-like.

As part of the invention, a mechanism can be arranged on the receiving part, as a result of which the receiving part is moveable between the operating position and the changing position. A suitable mechanism in this case is designed in such a manner that the same can transmit forces so that the receiving part can be moved through introduced forces between the operating position and the changing position. This can be for example a lever mechanism, a pulling or pushing or a turning mechanism that is suitable for transmitting or redirecting forces. Because of this, a facilitated position change of the receiving part and simultaneously a guided movement of the receiving part are made possible.

It is advantageous when the mechanism is operationally connected to the closure element, wherein in particular the drive serves for actuating the closure element and the receiving part. Here, the mechanism is connected with its one end to the receiving part and with its other end to the closure element, wherein through an operational connection according to the invention the drive of the closure element simultaneously moves the receiving part as well. Accordingly, upon a movement of the closure element into the open position, the receiving part is also moved into the changing position or in the case of the movement into the closing position, the receiving part is also moved into the operating position. This makes possible using a drive for the movement of both the closure element and also of the receiving part.

According to the invention, the mechanism can be variable in length, in particular comprise at least one cylinder and/or shock absorber and/or a telescopic rail. Accordingly it is made possible that different-length movement paths or movement sequences can be realized. A cylinder according to the invention can be a pneumatic cylinder or a hydraulic cylinder, in the case of which the energy is transmitted to a working cylinder via the working fluid. This makes possible that large forces can be transmitted and/or absorbed, wherein at the same time operation free of maintenance and wear can be ensured. A shock absorber has the advantage that in addition to the working fluid spring or damper elements in the form of for example elastomers can additionally absorb energy which can be advantageous for example in the case of an accident or external force effect. The configuration in the form of a telescopic rail in this case constitutes a cost-effective alternative to a shock absorber or a cylinder.

It is conceivable, furthermore, that on the receiving part a rotation element is arranged, to which the one end of the mechanism is connected. The other end of the mechanism in this case is connected to the closure element so that upon a rotary movement of the rotation element, the receiving part and simultaneously the closure element are translatorically moved. The rotation element in this case can be configured as a rotation body or as a crankshaft, which is fastened to the receiving part. Through a suitable configuration, components and thus required installation space can be saved which results in weight and space savings within the vehicle. Because of the transmission ratios, the mechanism is connected with the point of the rotation element which makes possible an optimized force transmission. Accordingly, the rotation element can also be dimensioned so that an optimized transmission ratio can be established. Within the scope of the invention it is conceivable that the rotation element is designed as a gear wheel and is operationally connected to a rack, as a result of which the rotation element is rotatable about an axis of rotation. When the rotation element is designed as a gear wheel and is operationally connected to a rack, a spur gearing is obtained, so that by way of the same larger forces can be transmitted or absorbed since in this case a certain self-retention is present. Here, a configuration similar to a rack railroad is conceivable, wherein the rotation element is configured as a gear wheel and is operationally connected to a rack, as a result of which upon a linear movement of the receiving part the rotation movement of the rotation element is ensured and adequate forces can be transmitted at the same time. This additionally has the advantage that canting of the receiving part is prevented and a guided movement is performed.

Within the scope of the invention it is conceivable, furthermore, that the drive is mechanical and/or fluidical and/or electrical. A mechanical drive in this case can mean a drive with a clamping device and a releasing device, such as is present for example with a torsion spring. This makes possible a cost-effective and simultaneously weight-saving drive configuration, in which the components are simply interchangeable. As fluidic drives, pneumatic or hydraulic drives are conceivable here, in the case of which a pump is required as source of energy for generating the required operating pressure. In comparison with the purely mechanical drives, greater forces can be transmitted and absorbed with fluidic drives so that larger battery modules can also be moved. Greater drive moments are required for example in vehicles requiring large battery modules, such as for example utility vehicles and construction machinery. Here, the battery modules can be significantly larger compared with the battery modules from passenger cars. Electric or electromechanical drives offer greater variability with respect to rotational speed, torque, position, speed control, in the case of which the relevant parameters can be changed via closed-loop control circuits. In addition to this, electric drives have a very good efficiency.

According to the invention it is conceivable that the closure element is mechanically connectable to a locking system of the motor vehicle. This can for example be a central locking system, which is connected for example to a passive entry system. Here, the locking system increases the security regarding the removal or damage of the battery modules by unauthorized persons. Accordingly and according to the invention, the closure element can only be unlocked or opened when the locking system of the vehicle has been unlocked. In the process, the closure element can be simultaneously opened with the central locking system of the vehicle or only be actuated through a further additional action to be carried out by the user. This further increases the security against manipulation of third parties.

Within the scope of the invention it is conceivable, furthermore, that the closure element is held in the closing position via self-retention of the mechanism or of the drive. Accordingly, no energy is needed in order to hold the closure element in the closing position. Self-retention in this case can be established through a suitable material pairing or surface roughness or through a suitable geometry of the mechanism.

Advantageously, the mechanism can comprise an emergency actuating element, as a result of which the mechanism is manually actuatable. This is to mean that by way of an emergency actuating element according to the invention the actual mechanism can be operated when there is no energy for the drive, by way of which the receiving part and the closure element can be moved. It is thus ensured that in the absence of energy the battery module can be changed so that charged battery modules can be installed. This emergency actuating element in this case can be configured similarly to a CD-ROM drive, wherein a mechanical object is operationally connected to the emergency actuating element in such a manner that the same is actuatable solely through force effect from the outside. The mechanical object in this case can have a security profile similar to a key so that intervention of unauthorized persons is prevented.

According to a further aspect of the invention a vehicle is claimed which is equipped with a battery changing device according to the invention.

With the vehicle, all advantages which were already described with respect to the device according to the invention are obtained.

Further measures improving the invention are obtained from the following description regarding some exemplary embodiments of the invention, which are schematically shown in the figures. All features and/or advantages including design details and spatial arrangements emanating from the claims, the description or the drawings can be substantial to the invention both by themselves as well as in a wide range of combinations.

DETAILED DESCRIPTION

Elements with the same function and mode of operation are marked with the same reference numbers in the FIGS. 1-6.

Figure 1:
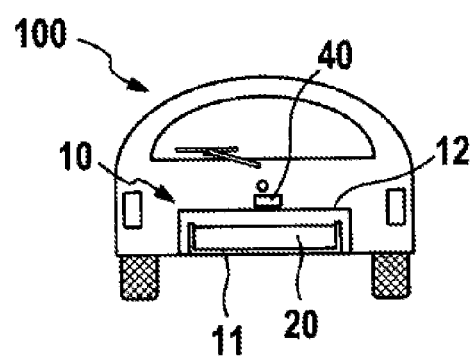
FIG. 1 schematically shows a vehicle according to the invention with a battery changing device according to the invention, FIG. 2 schematically shows a vehicle according to the invention with a battery changing device according to the invention in the operating position, FIG. 3 schematically shows a vehicle according to the invention with a battery changing device according to the invention in an intermediate position, FIG. 4 schematically shows a vehicle according to the invention with a battery changing device according to the invention in the changing position, FIG. 5 schematically shows a battery changing device according to the invention in the operating position, FIG. 6 schematically shows a battery changing device according to the invention in the changing position.

In FIG. 1, a vehicle 100 with a battery changing device 10 according to the invention is schematically shown, which comprises a receiving part 11, a battery module 20 and a closure element 12. The battery module 20 in this case is received in the receiving part 11. In addition to this, a drive 40 is depicted which is operationally connected to the closure element 12 and closes the receiving part 11 from the outside. The vehicle 100 is exemplarily shown in the rear perspective, so that the battery changing device 10 is arranged in such a manner that the battery module 20 can be interchangeable out of the rear of the vehicle 100.

Figure 2:
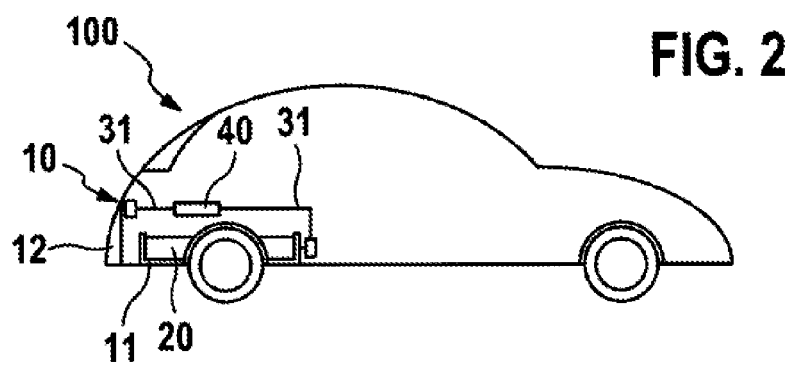
Figure 3:
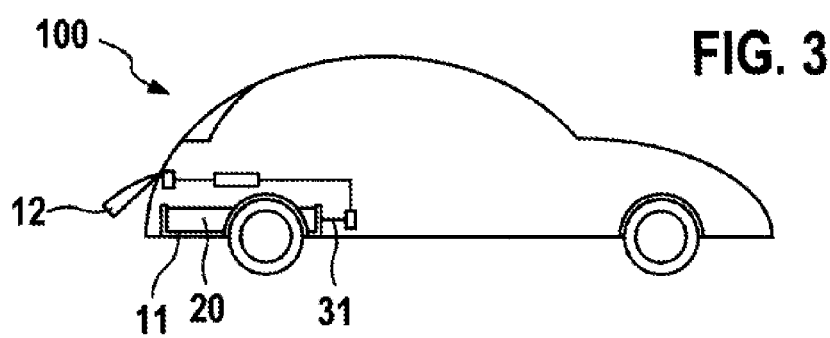
Figure 4:
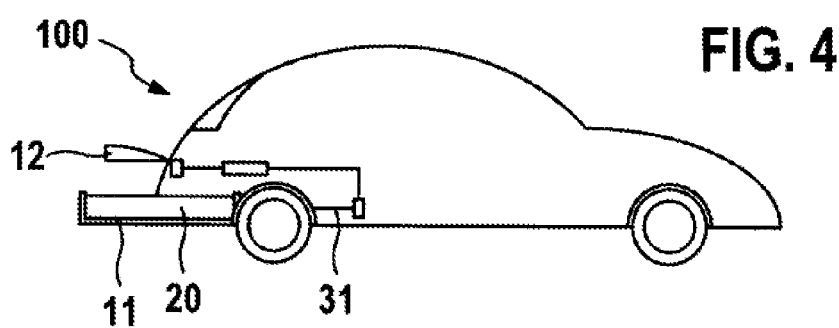

The FIGS. 2 to 4 show a vehicle 100 according to the invention with a battery changing device 10 according to the invention in various positions. In FIG. 2, the receiving part 11 is in the operating position, in which the battery module 20 is operable on the vehicle. As in FIG. 1, the battery changing device 10 is located in the region of the vehicle rear. In the shown closing position, the closure element 12 closes the receiving part 11 and is connected to the drive 40 via the mechanism 31. In addition to this, the drive 40 is connected to the receiving part 11 via the mechanism 31, as a result of which both closure element 12 and also the receiving part 11 have a common drive 40.

In FIG. 3, the receiving part 11 is in an intermediate position, which is located between the operating and the changing position. Here, the closure element 12 has already been opened to a certain degree, but the receiving part 11 is still positioned in the vehicle 100.

FIG. 4 shows the receiving part 11 with the received battery module 20 in the changing position, in which both the receiving part 11 and also the battery module 20 protrude out of the rear of the vehicle 100 at least in portions. The closure element 12 in this case is in the open position, in which the battery module 20 is interchangeable to the vehicle 100. The drive 40 is operationally connected to the mechanism 31, which in turn is connected both to the closure element 12 and also to the receiving part 11.

FIG. 5 shows the battery changing device 10 according to the invention in a possible embodiment version, wherein the receiving part 11 is positioned in the operating position and the closure element 12 in the closing position. The mechanism 31, in FIG. 5, comprises a cylinder that is variable in length, which with its one end is moveably connected to the closure element 12 and with its other end is moveably connected to a rotation element 32. The rotation element 32 is moveably arranged on the receiving part 11 and simultaneously serves as moveable support or guide for the receiving part 11. In the shown operating position, the mechanism 31 is in a stretched position, in which the receiving part 11 and thus the battery modules 20 are retained, so that contact with the vehicle electronics can be established.

In FIG. 6, the battery changing device 10 according to the invention is depicted in the embodiment version of FIG. 5, wherein the receiving part 11 is in the changing position and the closure element 12 in the open position. The mechanism 31 in this case is significantly shortened in its length, as a result of which the receiving part 11 is moved in the direction of the closure element 12. At the same time, the closure element 12 is positioned in the open position in such a manner that the receiving part 11 can be moved via the closure element 12. The rotation element 32 has likewise performed a rotary movement between the closing position and the open position. Thus, a movement process is obtained between the open position and the closing position, in the case of which the closure element 12 is folded about an axis while the one end of the mechanism 31 is also moved. At the same time, the cylinder of the mechanism 31 is moved from a stretched position into a compressed position and the rotation body 32, on which the other end of the mechanism 31 is arranged, rotates about an axis, as a result of which the receiving part 11 is moved in the direction of the closure element 12.

The invention claimed is:

1. A battery changing device (10) for an at least electrically drivable vehicle (100), the battery changing device comprising:
    at least one receiving part (11) for receiving at least one battery module (20), wherein the receiving part (11) is moveable between an operating position, in which the battery module (20) is operable on the vehicle (100), and a changing position, in which the battery module (20) is interchangeable to the vehicle (100),
    a drive (40) operationally connected to a closure element (12) for the receiving part (11), as a result of which the closure element (12) is moveable into a closing position, in which the battery module (20) is operable on the vehicle (100), and into an open position, in which the battery module (20) is interchangeable to the vehicle (100),
    a mechanism (31) arranged on the receiving part (11), the receiving part (11) being moveable by the mechanism (31) between the operating position and the changing position,
    wherein the mechanism (31) is operationally connected to the closure element (12), and wherein the drive (40) serves for actuating the closure element (12) and the receiving part (11).

2. The device (10) according to claim 1, characterized in that the mechanism (31) is operationally connected to the closure element (12).

3. The device (10) according to claim 1, characterized in that the mechanism (31) is variable in length.

4. The device (10) according to claim 1, characterized in that on the receiving part (11) a rotation element (32) is arranged, to which the one end of the mechanism (31) is connected.

5. The device (10) according to claim 1, characterized in that the drive (40) is one or more of: mechanical, fluidical, and electrical.

6. The device (10) according to claim 1, characterized in that the closure element (12) is connectable to a locking system of the vehicle (100).

7. The device (10) according to claim 1, characterized in that the closure element (12) is held in the closing position via self-retention of the mechanism or of the drive.

8. The device (10) according to claim 1, characterized in that the closure element (12) comprises an emergency actuating element, as a result of which the mechanism (31) is manually actuatable.

9. A vehicle (100) comprising:
  a battery changing device (10) including
    at least one receiving part (11) for receiving at least one battery module (20), wherein the receiving part (11) is moveable between an operating position, in which the battery module (20) is operable on the vehicle (100), and a changing position, in which the battery module (20) is interchangeable to the vehicle (100),
    a drive (40) operationally connected to a closure element (12) for the receiving part (11), as a result of which the closure element (12) is moveable into a closing position, in which the battery module (20) is operable on the vehicle (100), and into an open position, in which the battery module (20) is interchangeable to the vehicle (100),
    a mechanism (31) arranged on the receiving part (11), the receiving part (11) being moveable by the mechanism (31) between the operating position and the changing position,
    wherein the mechanism (31) is operationally connected to the closure element (12), and wherein the drive (40) serves for actuating the closure element (12) and the receiving part (11).

10. The device (10) according to claim 1, characterized in that the mechanism (31) is variable in length and comprises one or more of: a cylinder, a shock absorber, and a telescopic rail.

11. The device (10) according to claim 10, characterized in that on the receiving part (11) a rotation element (32) is arranged, to which the one end of the mechanism (31) is connected.

12. The device (10) according to claim 11, characterized in that the drive (40) is mechanical and/or fluidical and/or electrical and/or a combination thereof.

13. The device (10) according to claim 12, characterized in that the closure element (12) is connectable to a locking system of the vehicle (100).

14. The device (10) according to claim 13, characterized in that the closure element (12) is held in the closing position via self-retention of the mechanism or of the drive.

15. The device (10) according to claim 14, characterized in that the closure element (12) comprises an emergency actuating element, as a result of which the mechanism (31) is manually actuatable.

* * * * *